(12) United States Patent
Salmre et al.

(10) Patent No.: US 6,513,721 B1
(45) Date of Patent: Feb. 4, 2003

(54) METHODS AND ARRANGEMENTS FOR CONFIGURING PORTABLE SECURITY TOKEN FEATURES AND CONTENTS

(75) Inventors: Ivo William Salmre, Seattle, WA (US); Mark Gilbert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 09/724,748

(22) Filed: Nov. 27, 2000

(51) Int. Cl.[7] .............................. G06K 19/06; G06F 7/08
(52) U.S. Cl. ......................................... 235/492; 235/381
(58) Field of Search ................................. 235/381, 492, 235/380, 382, 383; 713/200; 725/152, 141, 133; 705/41

(56) References Cited

U.S. PATENT DOCUMENTS

| | | | | |
|---|---|---|---|---|
| 5,668,538 A | * | 9/1997 | Warwick | 307/140 |
| 5,889,941 A | * | 3/1999 | Tushie et al. | 235/380 |
| 6,014,748 A | * | 1/2000 | Tushie et al. | 257/679 |
| 6,134,130 A | * | 10/2000 | Connell et al. | 363/70 |
| 6,223,348 B1 | * | 4/2001 | Hayes et al. | 348/734 |
| 2001/0009039 A1 | * | 7/2001 | Hayes et al. | 725/133 |
| 2002/0099473 A1 | * | 7/2002 | Amadeo et al. | 700/251 |

* cited by examiner

Primary Examiner—Thien M. Le
(74) Attorney, Agent, or Firm—Lee & Hayes, PLLC

(57) ABSTRACT

Methods and arrangements are provided for use in developing, testing and programming portable security tokens and other like devices. In accordance with certain implementations, a solution manager tool is configured to substantially simplify the design of smart cards. The solution manager tool essentially integrates various design considerations associated with portable security tokens into an interactive environment that includes a graphical user interface (GUI) that allows developers to interactively and iteratively modify design requirements/features during the development process. The solution manager tool is configurable to support a multitude of different design requirements/features. By way of example, when used for smart card development, certain implementations of the solution manager tool may integrate security policy, file system management, operating system (OS) image selection, supported command sets on the smart card, GSM menu design, GSM event sinking, and other like selectable requirements/features.

36 Claims, 10 Drawing Sheets

METHODS AND ARRANGEMENTS FOR CONFIGURING PORTABLE SECURITY TOKEN FEATURES AND CONTENTS

TECHNICAL FIELD

This invention relates to portable security tokens, such as, e.g., smart cards, and more particularly to automated methods and arrangements for use in developing, designing, configuring, programming, and/or manufacturing portable security tokens.

BACKGROUND

Smart cards represent one type of portable security tokens that are becoming more and more popular. Conventional smart cards are basically small portable programmable devices having operatively coupled logic and memory circuitry. Smart cards can be, for example, configured to provide certain identification and/or cryptography capabilities that support secure operation of or access to other devices, services, etc.

Electrical interface contacts are exposed on a surface of conventional smart cards and operatively configured to allow other devices, such as, a smart card reader, to interact with the programmed features and/or contents of the smart card. The smart card reader may be further operatively coupled to a computer or other device that is programmed to interact with the smart card in some manner. The smart card reader may be part of a separate peripheral device or may be integrated into a device. By way of example, a mobile telephone may include an integral smart card interface. Further, the smart card may be fixed in place or removable.

Most smart cards are manufactured based on specified programmed logic (e.g., a compiled image). Typically, a designer seeking to include a smart card in a product such as a mobile telephone would need to investigate and understand the capabilities and features that are provided by various versions of smart cards available on the market today. Once a "suitable" smart card has been selected, the designer would need to learn how to effectively program the smart card to meet the product's required operation and make proper use of the smart card's capabilities.

Usually, the smart card design will be created on a personal computer (PC) or other like computer using software that is typically provided by the smart card manufacturer. The result is a compiled image. Experimental smart cards can then be made using the compiled image using a smart card writer that "flashes" the compiled image into the memory on the smart card. Once a final compiled image has been created and the resulting smart card performs satisfactory, then the final compiled image would most likely be provided to the smart card manufacturer for use in mass production of similar smart cards.

Developing smart cards in this manner can be difficult since the developers are often required to deal with low level details, e.g., which ROM masks to use for the solution being developed, laying out the file system for the smart card, setting security policies for the smart card, building a dispatch table that routes commands sent to the card to the appropriate applications, choosing events that the smart card is to synchronize with, etc.

Because many of these decisions and others are usually required to interact with one another, the smart card development process can be cumbersome, error prone and time consuming. Moreover, changes to the design are usually very difficult and time-consuming to make and thus innovation and experimentation often suffers.

Additionally, once a designer has invested time and effort into learning and understanding a particular manufacturer's smart card, they may be less inclined to become familiar with another manufacturer's smart card. This may not always lead to the selection of the "best" smart card for a particular application.

Consequently, there is a need for improved methods and arrangements that intelligently reduce the learning curve associated with the development of smart cards and other like portable security tokens, speed up the associated development cycle, and/or lead to improved product performance.

SUMMARY

Improved methods and arrangements are provided that tend to significantly reduce the difficulty often associated with developing portable security tokens, speed up the associated development cycle, and lead to improved product performance.

Thus, for example, in accordance with certain aspects of the present invention a tool is provided for use with a computer system. The tool may be software and/or hardware based. The tool includes at least one database that contains operational design-related information about at least two different portable security tokens. Hence, the designer need not know or otherwise learn several different manufacturers' portable security token capabilities. The tool also includes logic that is configured to interactively and selectively present at least a portion of the operational information via a graphical user interface (GUI) of the computer system. The logic also accepts user inputs via at least one computer system user mechanism and determines certain design requirements for the portable security token based at least on the portion of the operational information and the user inputs. The logic further generates at least one output file based on the design requirements. The output file is suitable for operatively programming at least one of the portable security tokens. Thus, for example, the output file may include an editable build script file ready for compilation or an already compiled binary image, for example.

The above stated needs and others are also met by a method that includes providing at least one database containing operational design-related information associated with at least two different portable security tokens, interactively and selectively presenting at least a portion of the operational information via a graphical user interface (GUI), accepting user inputs associated with the portion of the operational information presented via the GUI, determining design requirements based at least on the portion of the operational information and the user inputs, and generating at least one output file based on the design requirements, wherein the output file is suitable for operatively programming at least one of the portable security tokens.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

An exemplary solution manager tool is described below for use in developing, testing and programming portable security tokens and other like devices. In accordance with certain implementations, the solution manager tool can be a software application for use in a computing environment.

As described herein, the exemplary solution manager tool is configured to substantially simplify the design of smart cards. This is not meant, however, to limit the solution manager just to smart cards. Those skilled in the art will recognize that the solution manager tool is also applicable to other types of programmable portable security tokens, such as, e.g., badges, tags, rings, binders, etc.

As described herein, the exemplary solution manager tool integrates various design considerations associated with portable security tokens into an interactive environment that includes a graphical user interface (GUI) that allows the developers to interactively and iteratively modify design requirements/features during the development process. For the sake of brevity, only samplings of design requirements/features are described in detail. Nevertheless, those skilled in the art will recognize that the solution manager tool can be configured to support a multitude of different design requirements/features.

By way of example, when used for smart card development, certain implementations of the solution manager tool may integrate security policy, file system management, operating system (OS) image selection, supported command sets on the smart card, GSM menu design, GSM event sinking, and other like selectable requirements/features.

Figure 1:
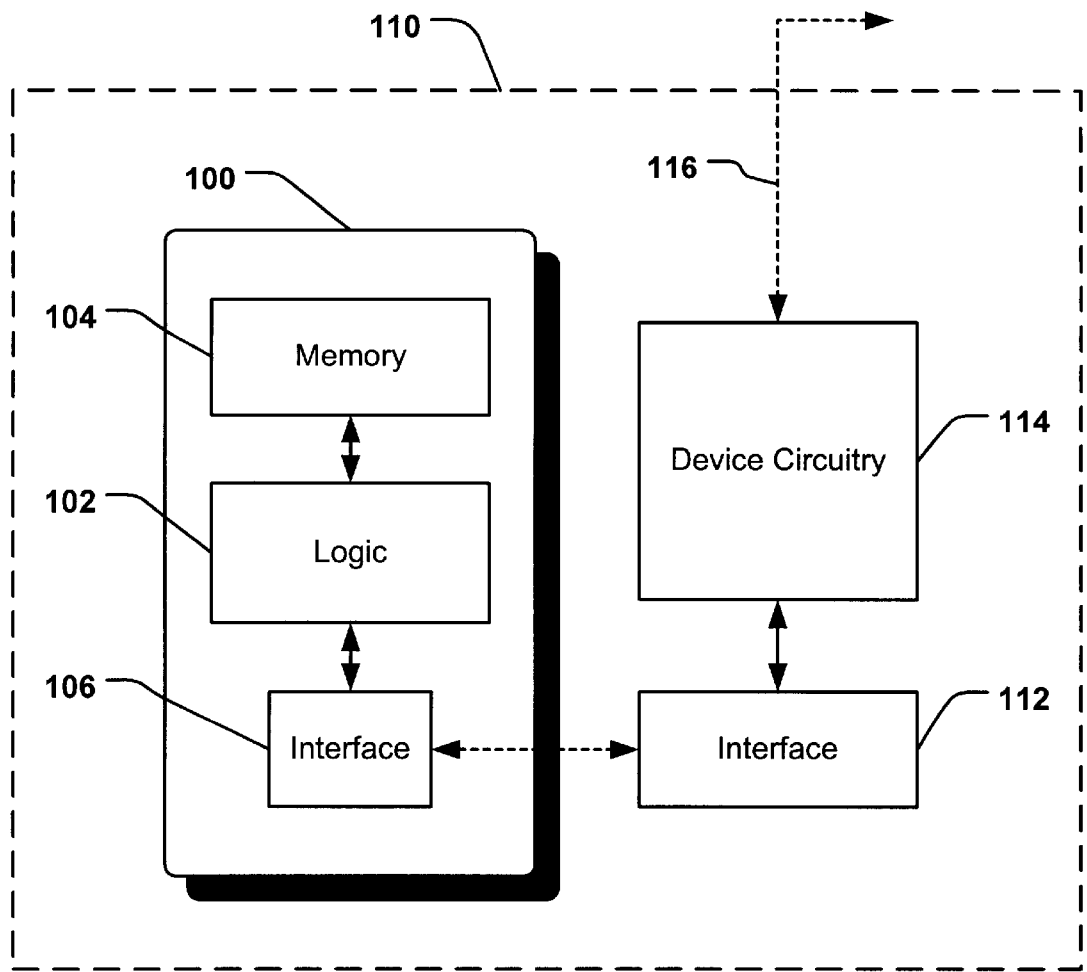
FIG. 1 is block diagram depicting an exemplary device that includes a portable security token in the form of a smart card.

With this in mind, FIG. 1 depicts a portable security token 100 having logic 102 operatively coupled to memory 104 and an interface 106. In accordance with certain implementations, portable security token 100 is in the form of a smart card. Smart cards are well known. Here, in this example, logic 102 is configured to be operatively responsive to instructions and/or contents from memory 104 and/or inputs provided from a host device 110 through interface 106. Logic 102 is also configured to provide outputs to host device 110 through interface 106.

Portable security token 100 is graphically shown within host device 110, which further includes, in this example, an interface 112 corresponding and operatively coupled to interface 106. Interface 112 is further coupled to device circuitry 114. Device circuitry 114 can include any type of circuitry depending upon the type of host device. For example, host device 110 may be a smart card reader peripheral device that is configurable to operate in a computer environment. The smart card reader would then provide inputs/outputs through a link 116.

In another example, host device 110 may be a mobile telephone that is configurable to operate within a GSM or other like mobile telephone communication system. Here, for example, device circuitry 114 would therefore include the applicable transmitter/receiver circuitry, antenna, keypad circuitry, display circuitry, microphone and speaker circuitry, etc. The transmitted and received signals would be carried over link 116. Portable security token 100, would most likely be a smart card that is configured to act as a subscriber identity module (SIM).

Figure 2:
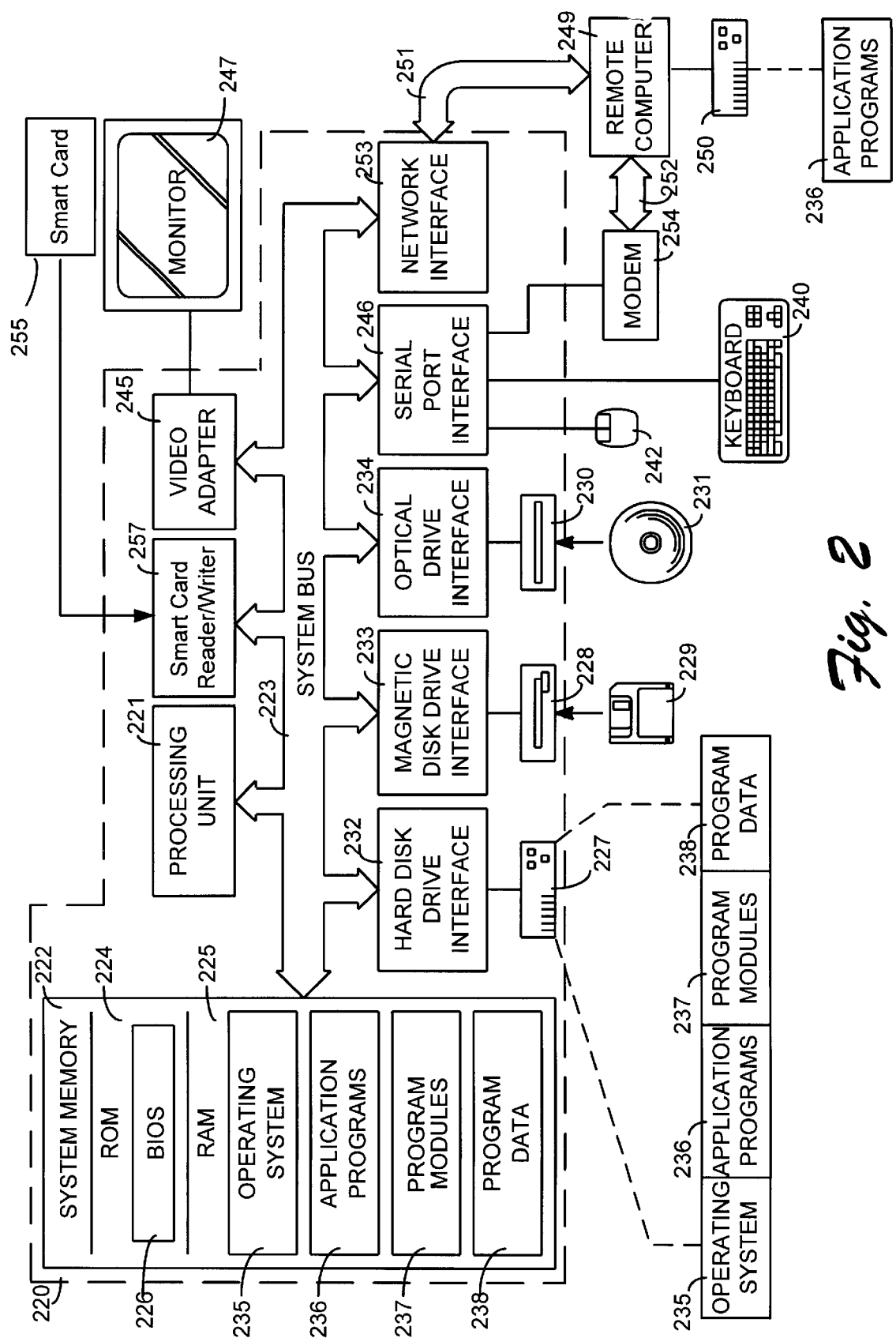
FIG. 2 is a block diagram depicting an exemplary computer environment that is suitable for use with certain implementations of the present invention.

Reference is now made to FIG. 2, which is a block diagram of an exemplary computing system 200. Computing system 200 can be used to provide a platform for the solution manager tool. Computing system 200 may also be used to operatively interact with an applicably programmed portable security token 100.

Computing system 200 is, in this example, a personal computer (PC), however, in other examples computing system may take the form of a special-purpose device, an appliance, a handheld computing device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse, etc.). An additional input mechanism(s) 255 can also be included via an appropriate interface 257.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

A smart card reader/writer 257 is shown as being connected to system bus 223. When configured to read a smart card 255, smart card reader/writer 257 operatively interacts with a previously programmed smart card. When configured to write a binary image to a smart card 255, smart card reader/writer 257 flashes the image to the smart card's memory. Smart card reader/writer 257 is illustrative only, in that, for example, certain implementations may include a separate reader and writer device.

Figure 3:
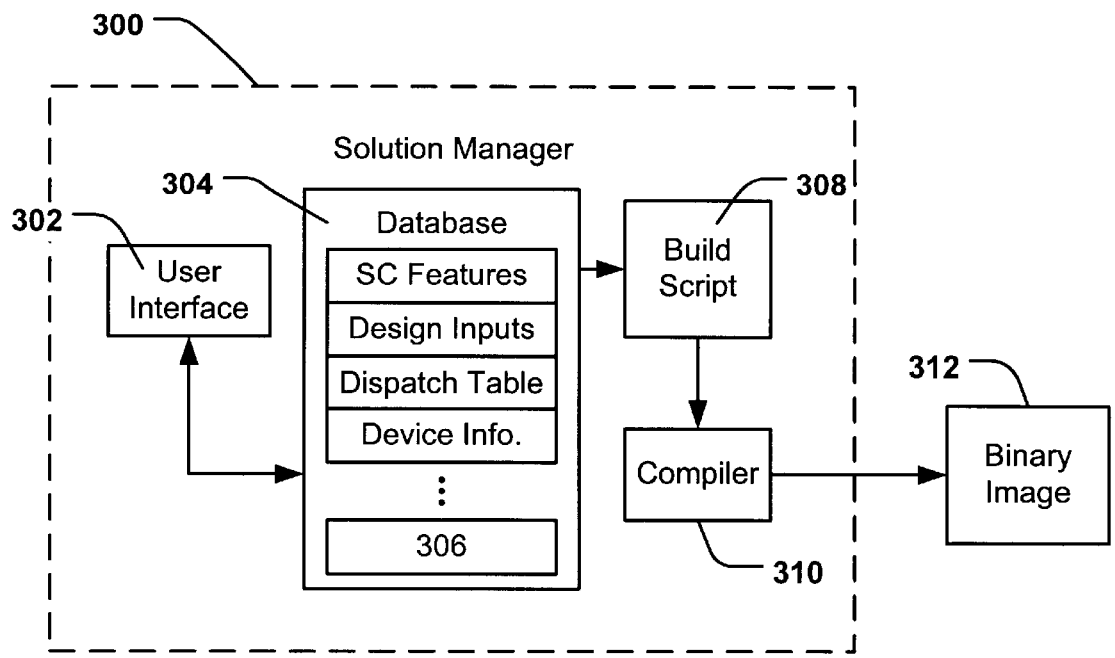
FIG. 3 is a functional block diagram of an exemplary solution manager tool suitable for developing portable security tokens as in FIG. 1, using a computer as in FIG. 2.

Reference is now made to FIG. 3, which is a functional block diagram of an exemplary solution manager tool 300 suitable for developing portable security token 100 using computer system 200, for example.

Solution manager tool 300 includes a user interface 302, preferably a GUI, that is configured to present the developer with an interactive environment through which certain smart card (SC) requirements/features are represented and selectable/definable, and the overall development process associated with solution manager tool 300 is presented and controlled.

As graphically depicted, solution manager tool 300 includes at least one database 304. In this example, database 304 is configured to include both pre-defined information (e.g., global files) and developer specified information. Thus, during the development process, database 304 may include listings of available SC requirements/features, listings of design inputs, such as, e.g., real and virtual files and ACLs, a dispatch table for routing requests from host device 110 to other applications, device information, such as, e.g., GSM menu configuration information and GSM event sinking (synchronization) information. As further depicted, other applicable information 306 may also be included within database 304 as needed to support the developing smart card solution.

Those skilled in the art will recognize that in certain implementations, separate databases may be used to hold the pre-defined information and the developer specified information. This is illustratively depicted, for example, in FIG. 4.

Solution manager tool 300 is further configured to generate a build script 308, based on the resulting smart card solution and associated information in database 304. In certain implementations, build script 308 is a batch instruction language or assembly language based file that can be further edited by advanced users and/or otherwise provided directly to a compiler 310. Compiler 310 processes the build script 308, as required for a targeted smart card platform, to produce a binary image 312. In the past, developers have built scripts (e.g., written programs) and compiled them according to individual smart card manufacturer's specifications. Hence, the process of compiling a build script is well known.

Binary image 312 can then be flashed to an experimental development smart card using a smart card reader, for example. Binary image 312 may also be configured for use with a smart card simulator program.

Once the developer is satisfied with the smart card solution, binary image 312 can be provided to a smart card manufacturer for mass production of smart cards in accordance therewith.

Figure 4:
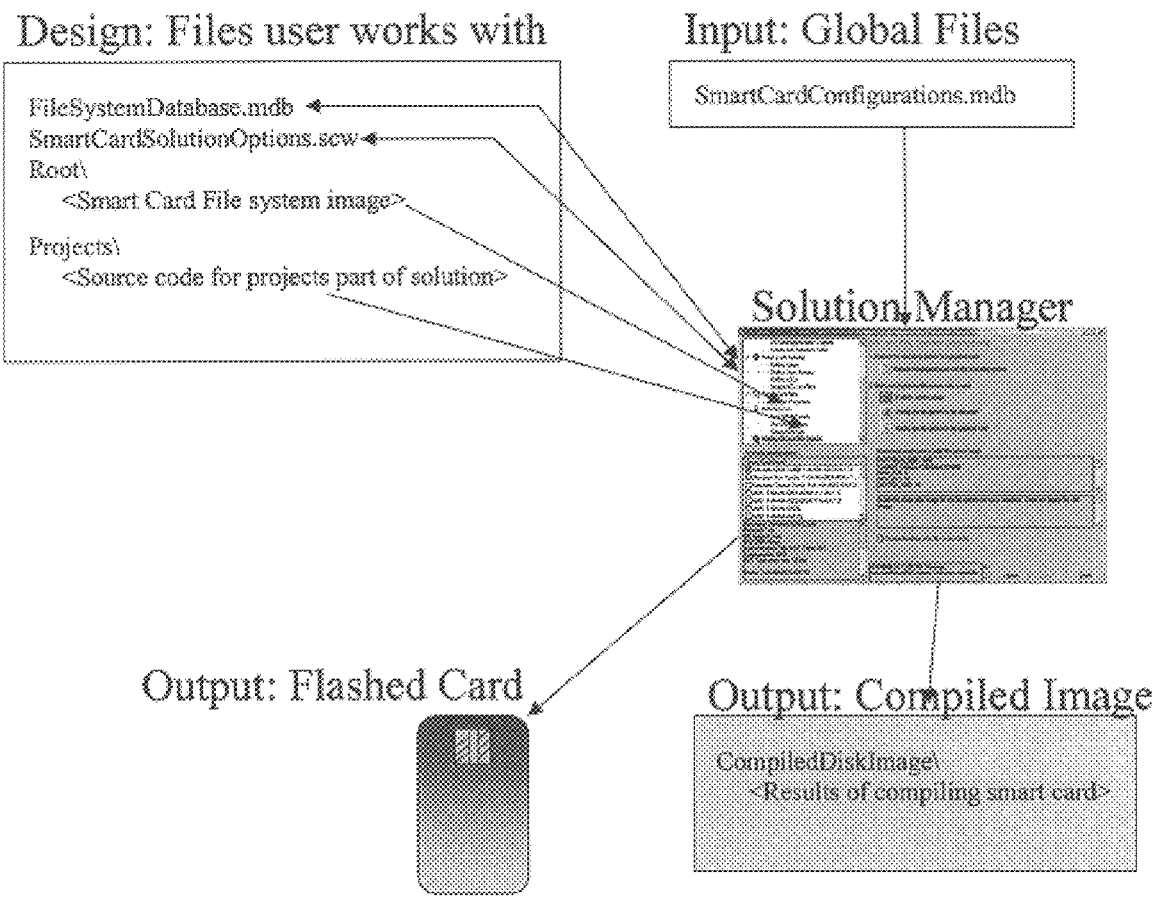
FIG. 4 is an illustrative process flow diagram associated with the exemplary solution manager tool as in FIG. 3.

FIG. 4 is an illustrative process flow diagram associated with the exemplary solution manager tool 300. As shown, various pre-defined information (e.g., global files) and developer specified information is presented through the solution manager GUI. As a result of the interactive development process presented by solutions manager tool 300 outputted binary image data may be selectively flashed to a smart card or stored for later use by a smart card manufacturer.

When the developer builds a binary image based on their design, business rules as specified through the solution manager GUI are applied to the smart card data and a file system image is produced. In this view, the business rules can be seen as a projecting the smart card's design database to produce a working smart-card image.

As shown in FIG. 4, a logically separate global database may be implemented to contain listings of various smart card OS images that are available and the requirements/features associated with each OS image. This global database can then be queried to present the developer with a listing of OS images available for them to use based on the requirements/features they select for their smart card solution.

Figure 5:
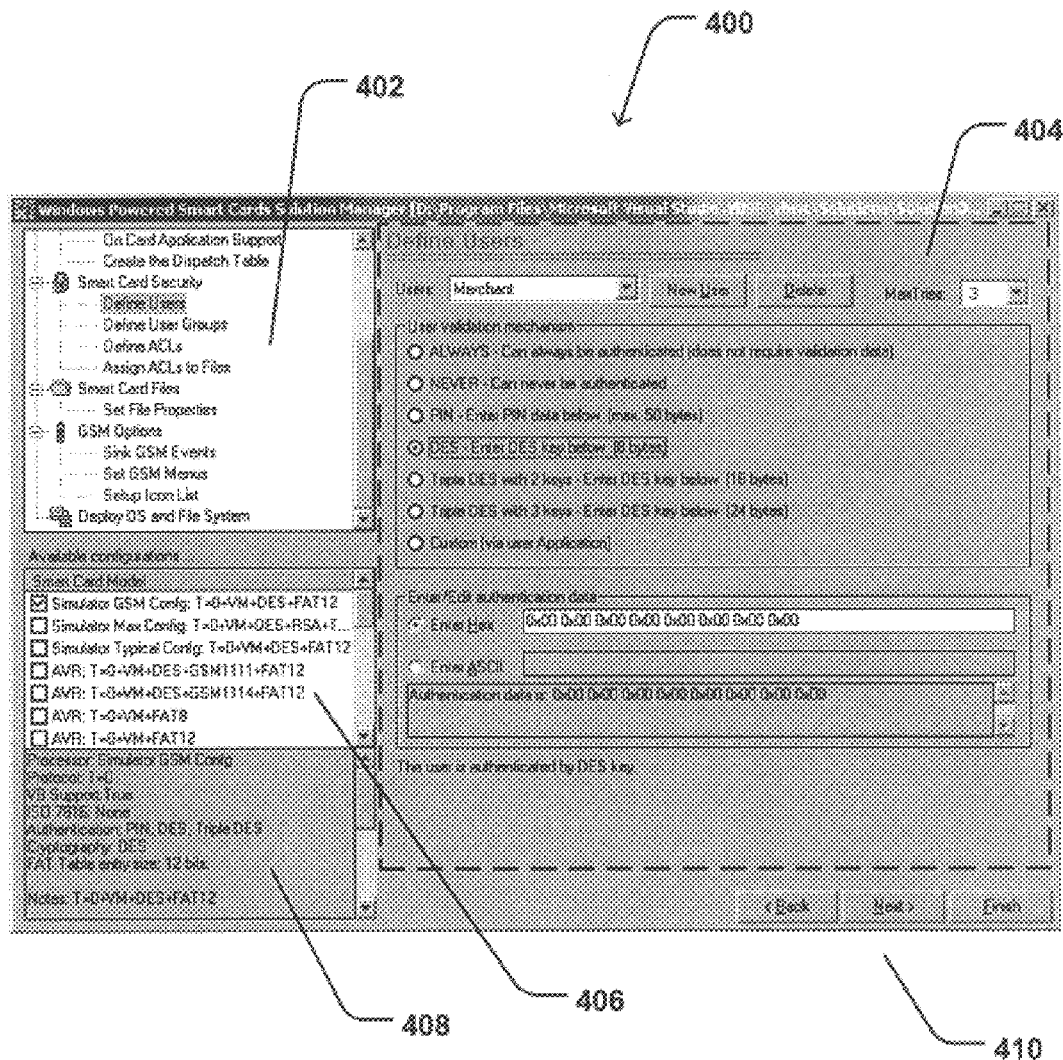
FIG. 5 is a screen shot of an exemplary graphical user interface (GUI) that allows the developer to selectively define certain requirements/features for the portable security token.

With this in mind, FIG. 5 is an exemplary screen shot of a solution manager GUI 400 that allows the developer to selectively define certain requirements/features for the portable security token 100. Once again, in this example, portable security token 100 happens to be a smart card.

In FIG. 5, GUI 400 includes a feature selection area 402, an input interface area 404, a configuration selection area 406, a selected configuration area 408, and a process step control area 410.

Feature selection area 402 is configured, in this example, to present the developer with a hierarchical menu of selectable and/or settable features/requirements associated with the portable security token as represented by the global data (e.g., SC features) maintained within database 304. Here, the developer has scrolled down through a listing of various requirements/features in feature selection area 402 and has selected to establish the smart card's security policy. As part of an initial step of the design process associated with the security policy, the developer needs to define certain users associated with the smart card. Hence, as shown in this example, under the heading of "Smart Card Security", the "Define Users" selectable text in feature selection area 402 has been highlighted. As described below, the selections made in feature selection area 402 operatively manage the remaining areas of GUI 400. For example, selection of the "Define Users" selectable text in feature selection area 402 causes input interface area 404 (within dashed lines) to present the developer with a user-friendly GUI that can be used to define users and how each of the users are authenticated.

Drawing attention back to feature selection area 402, additional exemplary steps associated with establishing a security policy for the smart card are shown below the "Define Users" selectable text. Thus, as shown, after defining user(s), the developer can further define certain user groups, ACLs, and/or assign certain ACLs to particular files.

In accordance with certain aspects of the present invention, therefore, the requirements/features associated with the portable security token are essentially presented to the developer in a number of pre-defined steps listed in feature selection area 402, through which the developer can navigate using the buttons presented in process step area 410 of GUI 400. This allows the developer to selectively develop a portable security token in an interactive process based on a top-down design perspective, rather than a conventional bottom-up design perspective.

Configuration selection area 406 is configured to present the developer with a listing of smart card models that currently capable of meeting the developers inputted or otherwise selected requirements/features. In this example, solution manager tool 300 has determined that several smart card models are available for selection. Here, the developer has currently selected a particular "Simulator GSM" configuration as represented by the check marked box. The developer may at some later stage, decide to select some other available smart card model. In certain implementations, the developer can wait until the end of the interactive development process before selecting from the remaining available smart cards in configuration selection area 406.

In accordance with certain further implementations, as the interactive process is continued and design selections are made, solution manager tool 300 determines which of the smart card models meets the requirements/features and identifies this by either changing the appearance of the selectable text associated with individual smart card models or by eliminating individual smart card models from the listing in configuration selection area 406.

Figure 6:
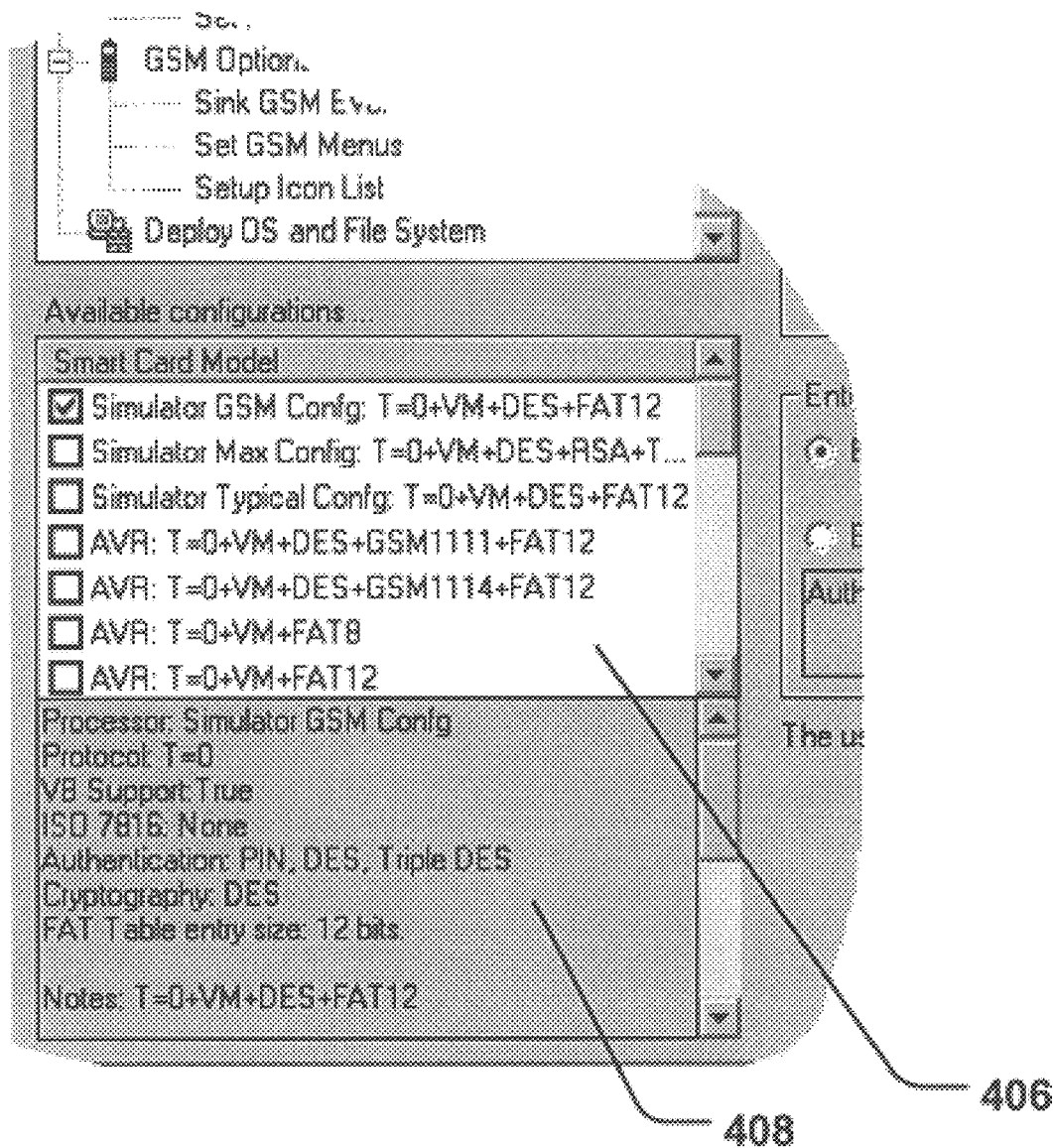
FIG. 6 is a close up view of a portion of the screen shot of the exemplary GUI in FIG. 5.

Certain high-level design criteria are shown in selected configuration area 408. A close-up portion is shown in FIG. 6. In this example, certain features associated with the selected smart card in configuration selection area 406 are listed in selected configuration area 408. These listed features will likely be useful to the developer during the on-going interactive design process. Thus, for example, here the developer can see that the selected Simulator GSM Configuration is compatible with the selected security policy in input interface area 404 (for a defined user identified as "merchant"), since the developer is requesting DES user validation mechanism and the selected Simulator GSM Configuration is able to provide such a mechanism.

It should be kept in mind that GUI 400, and the areas therein, are meant as examples only. Different types of portable security tokens 100 and/or computer systems 200 may require a different GUI configuration.

As shown in the example in FIG. 5, the developer has established the smart card's security policy by defining authorized card users (a.k.a. Known Principals) and their associated validation or authentication mechanism(s), creating/designing file ACLs for the smart card, and assigning ACLs to smart card member files. In this manner, the developer is easily able to create new Known Principals (i.e. parties that the card recognizes and grants access permissions to), choose what authentication an mechanisms each Known Principal will use, and easily modify this data as it suites them through the interactive design process.

As depicted further in FIG. 6, the process of choosing an appropriate smart card OS mask (binary image of OS) based on selected features is also made easier. Here, based on the selected smart card requirements/features, solution manager tool 300 displays a list of smart card OS images that meet the developers demands. The developer is then free to choose the appropriate smart card OS image that meets the product's needs. The developer is also free at anytime to change the OS image they are targeting (e.g., choosing a larger or smaller OS or File System, choosing a different card manufacturer, etc).

A developer may also create files in a PC-based file system environment that contain script information suitable for use with solution manager tool 300. Since the script information need not be in binary format, it should prove easier to manipulate or otherwise modify during the design process.

Figure 7:
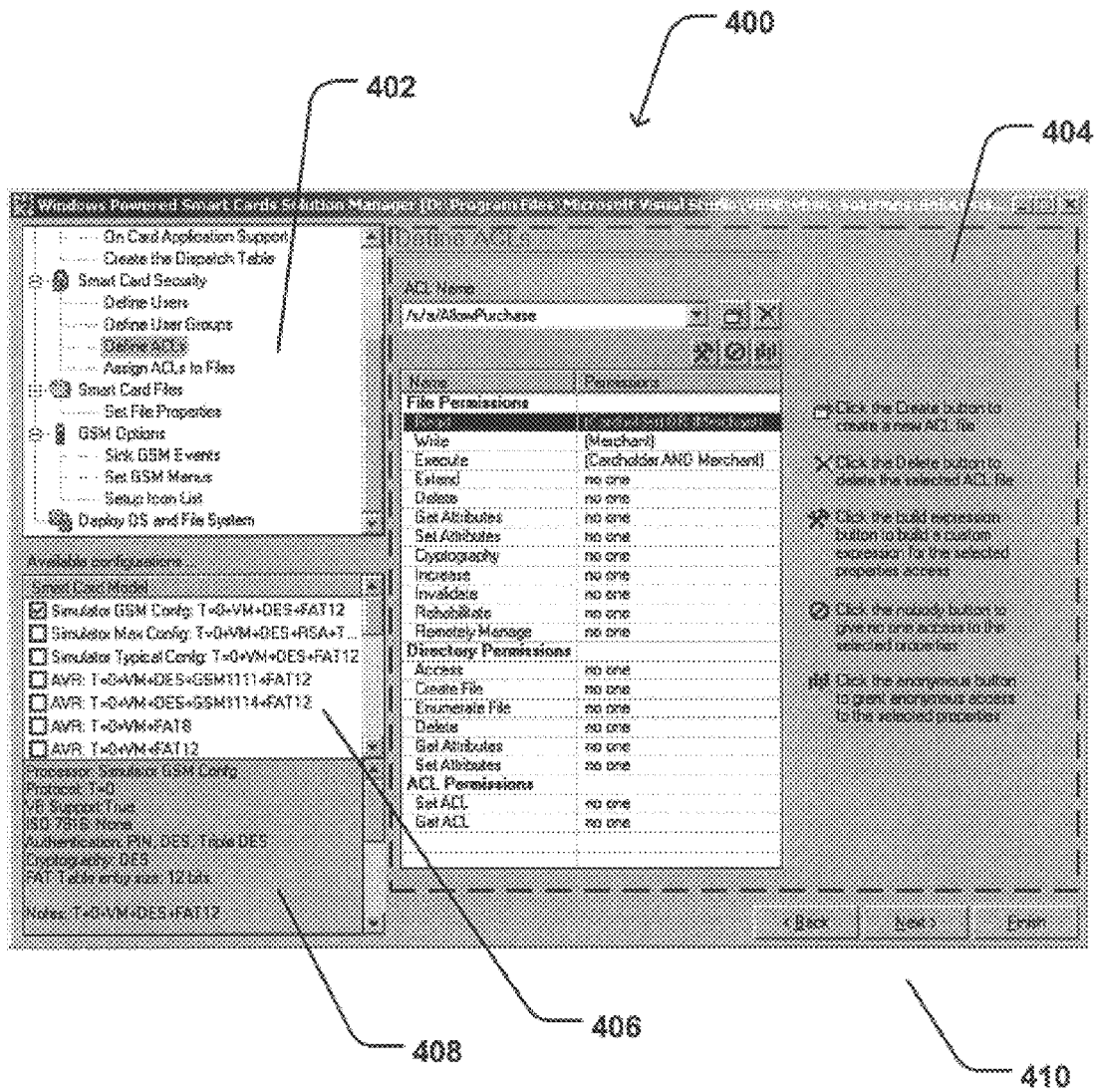
FIG. 7 is a screen shot of an exemplary GUI that allows the developer to selectively define certain access control lists (ACLs) associated with the portable security token.

FIG. 7 continues with the example above, with the step of defining (i.e., creating, editing, deleting) ACLs. Here, GUI 400 is configured to allow the developer to build and design ACLs interactively by establishing logical rules within input interface area 404. The resulting ACLs essentially define what file operations can/cannot be performed by each of the Known Principals.

In this example, the highlighted (selected editable text) establishes that files contents associated with this ACL (i.e., "AllowPurchase") can be Read if the Cardholder OR the Merchant have succeeded in authenticating themselves to the card. Further in this example, only the Merchant has permission Write to the files on the smart card. Also shown, for example, is that "no one", that is no Known Principal is allowed to Extend or Delete file permissions. It is also possible, as shown in this example, to grant anonymous access to any of the various selectable ACL properties.

Figure 8:
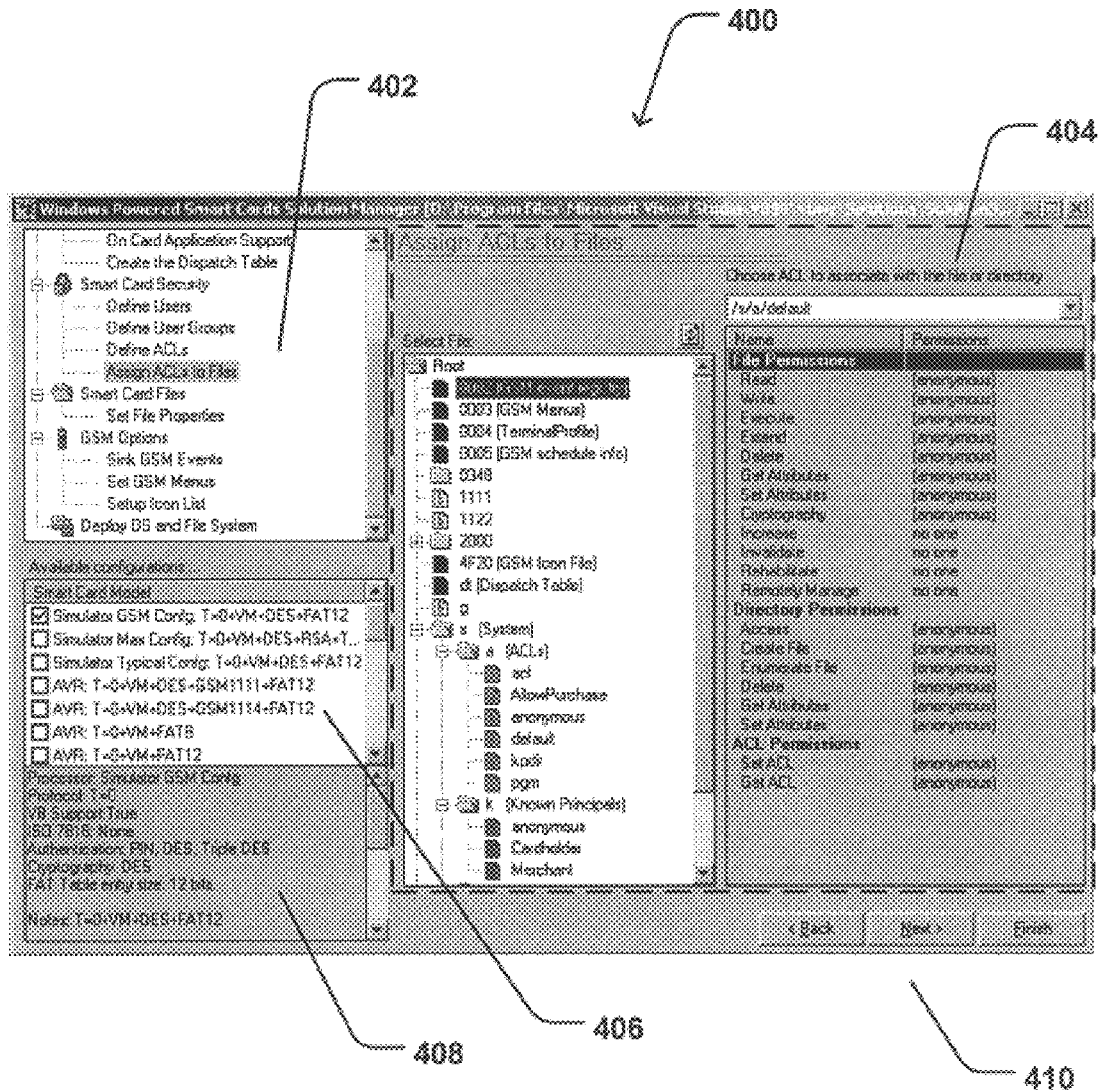
FIG. 8 is a screen shot of an exemplary GUI that allows the developer to graphically manage real and virtual files associated with the design requirements/features of the portable security token.

In FIG. 8, exemplary GUI 400 is configured to allow the developer to graphically manage both real and virtual files system members associated with the design requirements/features of the portable security token. As used herein, real file system members are those files that are represented as a mirror image on the Windows™ (or like) file system, allowing familiar access/modification as to the developer. This real file system image can later be mapped onto the smart cards file system. Conversely, virtual file system members are those files whose contents are not defined on the Windows™ (or like) file system. Typically, these file contents are derived by solution manager tool 300 when build script 308 is generated. By way of example, a file that contains all of the information on which events should trigger which applications is a virtual file and its contents are generated by solution manager tool 300 by examining the contents of the solution's associated database 304.

In FIG. 8, input interface area 404 includes a list of real and virtual files for the smart card. In certain implementations, the file system elements are color-coded or otherwise altered to allow easy recognition by the user of the files type and purpose. For example, files 0002 and 0003 are darkened to represent that they are virtual files. Files 1111 and 1122 are real files and therefore are not as dark of shade as files 0002 and 0003. In this manner, the developer may easily associate ACLs with real or virtual files in the file system by selecting a specific file and choosing an ACL to associate with it.

Figure 9:
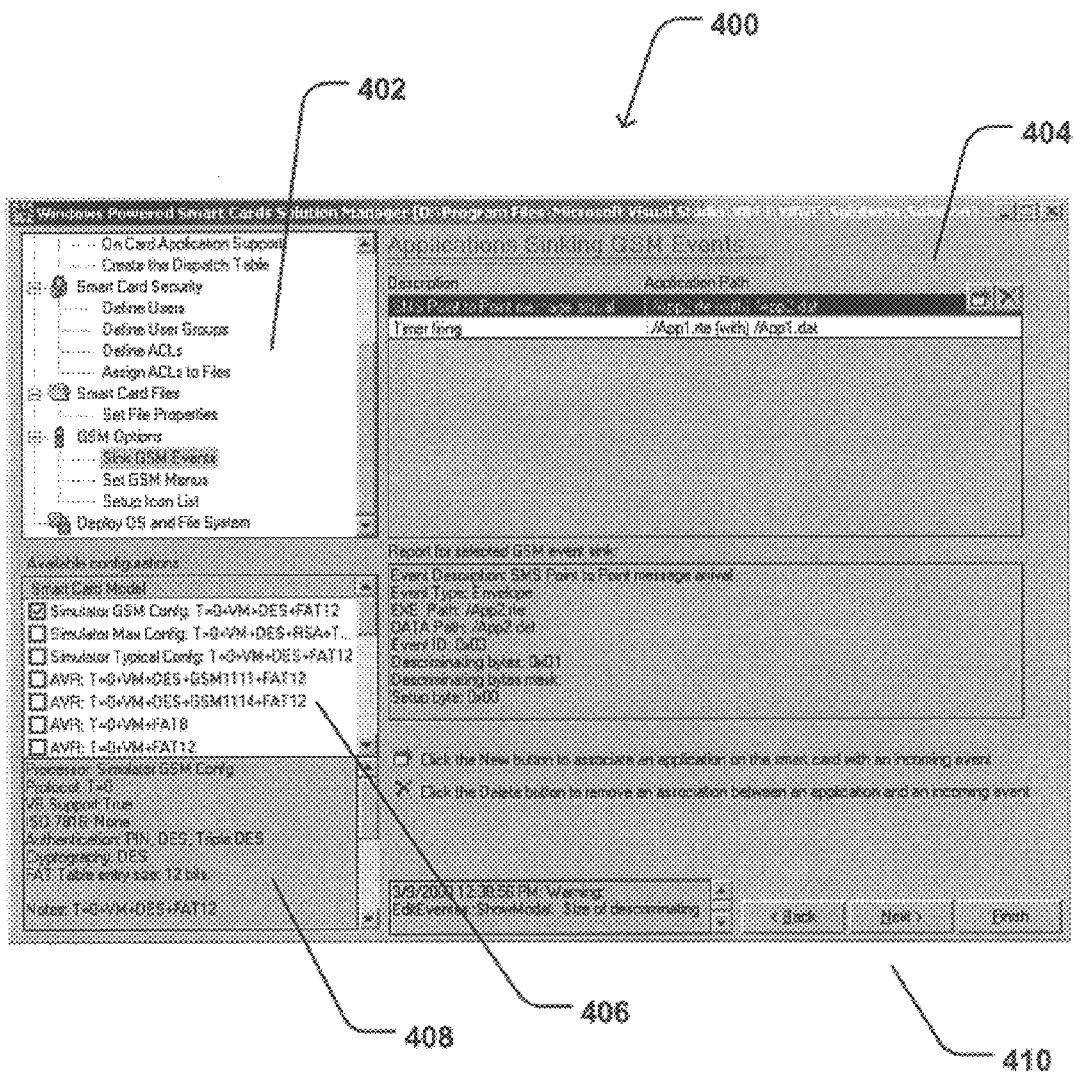
FIG. 9 is a screen shot of an exemplary GUI that allows the developer to selectively define global system for mobile communications (GSM) related requirements/features for the portable security token.

In FIG. 9, GUI 400 is further depicted as supporting certain implementations of solution manager tool 300 that provide an interactive design process for a portable security token, in the form of a smart card for use with a GSM communication device, such as, e.g., a mobile telephone. Those skilled in the art of developing GSM products are familiar with the GSM communication system and standards. Consequently, this text will not present an extensive presentation of the applicable GSM product and/or system operative environment.

As depicted in this example, the developer is able to select in feature selection area 402 those requirements/features they seek to address. In this example, the developer is establishing GSM options, and in particular is establishing applications sinking GSM events. Here, the developer has selected (as highlighted) the sinking of a SMS point to point message arrival event with an application App2. Further details of the sinking are also depicted in input interface area 404.

Based on this and other GSM options, the developer is therefore able to graphically and operatively associate GSM Events and GSM Menu Item(s) with specific applications. Additionally, the developer can build a list of GSM icons that are part of the smart card solution. Such icons may be displayed on a mobile telephone, for example.

Figure 10:
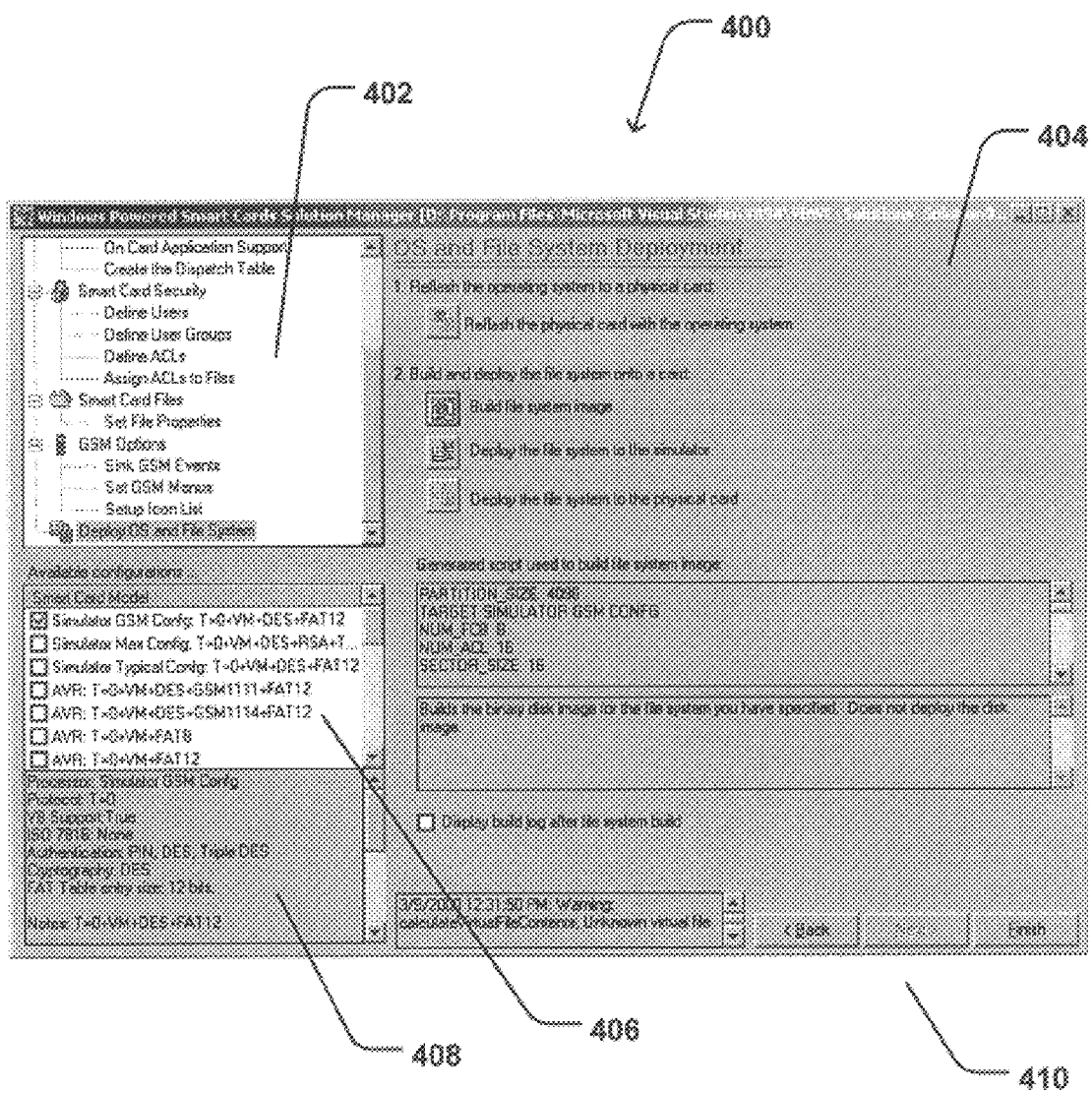
FIG. 10 is a screen shot of an exemplary GUI that allows the developer to selectively control the output of a binary file suitable for programming the portable security token in accordance with the developer specified requirements/features.

The screen shot in FIG. 10 demonstrates how exemplary GUI 400 can be used to allow the developer to selectively control the output of binary image 312 based on the interactive/iterative design process provided by solution manager tool 300.

As shown in FIG. 10, GUI 400 is configured to allow the developer to electively build binary image 312 such that the associated OS and file system can be flashed onto a development smart card (e.g., for testing with real smart cards), and/or to prepare the binary image 312 for use by a smart card manufacture. Alternatively, binary image 312 may be configured for use with a smart card simulator program or apparatus.

At the end of the build, an exemplary build status report can be displayed or otherwise output. By way of example, the following build status report has been generated for the developer in the above examples.

Summary: Build SUCCEEDED.

File system image build script created: D:\Program Files\Microsoft Visual Studio\VB98\VBWC\Solutions\Solution36Compiled DiskImage\fsimage.txt Simulator file system binary image created.

Physical card file system binary image created.

Created file describing configuration: D:\Program Files\Microsoft Visual Studio\VB98\VBWC\Solutions\Solution36\Compiled DiskImage\Configuration Info.txt Smart card registry file created: D:\Program Files\Microsoft Visual Studio\VB98\VBWC\Solutions\Solution36Compiled DiskImage\RegisterCard.reg Smart card configuration file created: D:\Program Files\Microsoft Visual Studio\VB98\VBWC\Solutions\Solution36\config.txt One or more of these resulting files can then be provided to manufactures for mass production of cards.

Additionally, as mentioned above, the developer can selectively flash binary image 312 onto physical development cards or the software simulator, allowing for rapid development and debugging.

With the examples above, it can be seen that solution manager tool 300 fills a widening gap in the portable security token market, and in particular the smart card market by providing a general-purpose OS offering and a user-friendly GUI-based environment for rapid development. Solution manager tool 300 allows developers to rapidly move from idea to prototype to working solution. As demonstrated, solution manager tool 300 allows developers to easily move their solution from one portable security token platform to another, work with both the simulators and physical cards, graphically visualize and manage the contents of their developing solution, and interactively choose the features and resource requirements of their solution.

Although some preferred implementations of various methods and arrangements have been illustrated in the accompanying Drawings and described in the foregoing Description, it will be understood that the invention is not limited to the exemplary implementations disclosed, but is capable of numerous rearrangements, modifications and substitutions as set forth and defined by the following claims.

What is claimed is:

1. A tool for use with a computer system having a user output mechanism and a user input mechanism, the tool comprising:

at least one database containing operational information associated with at least two different portable security tokens; and logic configured to interactively and selectively present at least a portion of the operational information via a graphical user interface (GUI) through the user output mechanism, accept associated user inputs through the user input mechanism, determine design requirements based at least on the portion of the operational information and the user inputs, and generate at least one output file based on the design requirements, wherein the output file is suitable for operatively programming at least one of the portable security tokens.

2. The tool as recited in claim 1, wherein at least one of the portable security tokens is a smart card.

3. The tool as recited in claim 1, wherein the output file includes an editable build script file.

4. The tool as recited in claim 1, wherein the output file includes a compiled binary image.

5. The tool as recited in claim 4, wherein the computer system further includes a portable security token writing mechanism and the logic is further configured to write the compiled binary image to the portable security token through the portable security token writing mechanism.

6. The tool as recited in claim 4, wherein the compiled binary image is suitable for use in mass production of the portable security token.

7. The tool as recited in claim 1, wherein the output file is suitable for use with a computer-based simulation of the portable security token.

8. The tool as recited in claim 1, wherein the GUI includes at least one area selected from a group of areas comprising a feature selection area, an input interface area, a configuration selection area, a selected configuration area, and a process step area.

9. The tool as recited in claim 1, wherein the logic is further configured support the establishment of at least one operative feature associated with the portable security token selected from a group of operative features comprising a security policy feature, a file system management feature, an operating system (OS) image selection feature, a supported command set feature, a menu design feature, an event sinking feature, and an icon list feature.

10. The tool as recited in claim 9, wherein the menu design feature includes a GSM menu design feature, and the event sinking feature includes a GSM event sinking feature.

11. The tool as recited in claim 9, wherein the file system management feature provides graphical management over both real and virtual file members.

12. The tool as recited in claim 1, wherein the design requirements include selected information associated with a PC-based file system directory.

13. A method comprising:
providing at least one database containing operational information associated with at least two different portable security tokens;
interactively and selectively presenting at least a portion of the operational information via a graphical user interface (GUI),
accepting user inputs associated with the portion of the operational information presented via the GUI,
determining design requirements based at least on the portion of the operational information and the user inputs, and
generating at least one output file based on the design requirements, wherein the output file is suitable for operatively programming at least one of the portable security tokens.

14. The method as recited in claim 13, wherein at least one of the portable security tokens is a smart card.

15. The method as recited in claim 13, wherein generating the output file includes generating an editable build script file.

16. The method as recited in claim 13, wherein generating the output file includes generating a compiled binary image.

17. The method as recited in claim 16, further comprising:
writing the compiled binary image to the portable security token.

18. The method as recited in claim 16, wherein the compiled binary image is suitable for use in mass production of the portable security token.

19. The method as recited in claim 13, wherein the output file is suitable for use with a computer-based simulation of the portable security token.

20. The method as recited in claim 13, wherein presenting the operational information via the GUI further includes providing at least one area within the GUI that is selected from a group of areas comprising a feature selection area, an input interface area, a configuration selection area, a selected configuration area, and a process step area.

21. The method as recited in claim 13, wherein determining design requirements further includes establishing at least one operative feature associated with the portable security token selected from a group of operative features comprising a security policy feature, a file system management feature, an operating system (OS) image selection feature, a supported command set feature, a menu design feature, an event sinking feature, and an icon list feature.

22. The method as recited in claim 21, wherein the menu design feature includes a GSM menu design feature, and the event sinking feature includes a GSM event sinking feature.

23. The method as recited in claim 21, wherein the file system management feature provides graphical management over both real and virtual file members.

24. The method as recited in claim 13, wherein the design requirements further include selected information associated with a PC-based file system directory.

25. A computer-readable medium having computer-executable instructions for performing steps comprising:
providing at least one database containing operational information associated with at least two different portable security tokens;
interactively and selectively presenting at least a portion of the operational information via a graphical user interface (GUI),
accepting user inputs associated with the portion of the operational information presented via the GUI,
determining design requirements based at least on the portion of the operational information and the user inputs, and
generating at least one output file based on the design requirements, wherein the output file is suitable for operatively programming at least one of the portable security tokens.

26. The computer-readable medium as recited in claim 25, wherein at least one of the portable security tokens is a smart card.

27. The computer-readable medium as recited in claim 25, wherein generating the output file includes generating an editable build script file.

28. The computer-readable medium as recited in claim 25, wherein generating the output file includes generating a compiled binary image.

29. The computer-readable medium as recited in claim 28, having further computer-executable instructions for performing the step of:
writing the compiled binary image to the portable security token.

30. The computer-readable medium as recited in claim 28, wherein the compiled binary image is suitable for use in mass production of the portable security token.

31. The computer-readable medium as recited in claim 25, wherein the output file is suitable for use with a computer-based simulation of the portable security token.

32. The computer-readable medium as recited in claim 25, wherein presenting the operational information via the GUI further includes providing at least one area within the GUI that is selected from a group of areas comprising a feature selection area, an input interface area, a configuration selection area, a selected configuration area, and a process step area.

33. The computer-readable medium as recited in claim 25, wherein determining design requirements further includes establishing at least one operative feature associated with the portable security token selected from a group of operative features comprising a security policy feature, a file system management feature, an operating system (OS) image selection feature, a supported command set feature, a menu design feature, an event sinking feature, and an icon list feature.

34. The computer-readable medium as recited in claim 33, wherein the menu design feature includes a GSM menu design feature, and the event sinking feature includes a GSM event sinking feature.

35. The computer-readable medium as recited in claim 33, wherein the file system management feature provides graphical management over both real and virtual file members.

36. The computer-readable medium as recited in claim 25, wherein the design requirements further include selected information associated with a PC-based file system directory.

* * * * *